Sept. 16, 1969          R. A. REICHEL          3,467,363

NOISE GENERATOR FOR SHAKING LOOSE PACKED MATERIAL

Filed Aug 31, 1967

INVENTOR.
RICHARD A. REICHEL
BY
*Elliott & Pastoriza*
ATTORNEYS

United States Patent Office 3,467,363
Patented Sept. 16, 1969

3,467,363
NOISE GENERATOR FOR SHAKING
LOOSE PACKED MATERIAL
Richard Alan Reichel, 324 Palm Ave.,
Santa Barbara, Calif. 93101
Filed Aug. 31, 1967, Ser. No. 664,842
Int. Cl. B01f 11/00; G10k 9/04
U.S. Cl. 259—36                7 Claims

ABSTRACT OF THE DISCLOSURE

This disclosure relates to a noise generator adapted to be secured to a silo or similar enclosure to shake loose material therein which tends to become packed against the side walls of the enclosure. The generator comprises a valve body defining an air chamber coupled to an acoustic impedance matching horn. This horn in turn has its outlet coupled to the silo or other enclosure and a suitable valve structure within the valve body is actuated to release air held under pressure within the valve body through the horn thereby generating a shock wave which will shake loose the impacted material and thereby permit more efficient emptying of the silo or enclosure. Preferably a sound transducer is coupled to the silo and generator to trigger the generator and provide a series of shock waves at a repetition rate corresponding to a resonant frequency of the silo or enclosure.

---

This invention relates generally to noise generators and more particularly to a novel noise generator for shaking loose packed material in storage enclosure.

It is common practice to store large quantities of granular or powder-like material such as wheat, powdered cement, and similar products in large silos, generally of cylindrical shape. These silos may range in size from ten to one hundred feet in diameter and from twenty to two hundred feet in height or even greater. Normally, the material stored in the silo is drained from the bottom of the silo through a suitable outlet opening. In the case of granular or powder-like materials, the central portion of the material within the silo is generally passed through the outlet opening first, other portions of the material tending to cling to the interior annular walls of the silo. The central portion leaves what is known in the art as a "rat hole" in the material and the actual amount of material removed corresponds to the amount of volume defined by the "rat hole." This volume may be less than fifty percent of the total material stored in the silo.

As a consequence of the foregoing, it is usually necessary to have a worker enter a suitable manhole normally provided at the upper end of the silo and attempt to work the material loose from its impacted condition so that more material may be removed from the silo. In other instances, the silo is simply refilled for further future storage with the result that only a given percentage of the total volume of the silo is useful for storage purposes.

Generally, the silos are made of concrete and thus have porous interior walls. The porous nature of these walls contributes to the problem of packed material clinging to the interior walls. While it might be possible to line the interior walls of silos with a non-sticking or smooth coating which would prevent or materially reduce the tendency for the stored material to cling to the walls, the enormous size of silos would render the costs for applying such coatings prohibitive.

Along with the foregoing problems, are general cleaning problems associated with silos and other equivalent types of storage enclosures. The tendency for the material to cling to the interior walls as a consequence of the physical structure renders it difficult to efficiently clean the silos since it is necessary to remove all of this material prior to any thorough cleaning operation. Still another problem involves the fact that an operator really does not know the effective volume of material being stored by the silo.

With the above in mind, it is a primary object of the present invention to provide a novel apparatus in the form of a noise generator which will function to shake loose impacted materials stored in silos or similar structures to the end that the foregoing problems are overcome.

More particularly, it is an object to provide a noise generator which may very easily be secured to a silo or similar enclosure and retained permanently in place and actuated only when it is desired to shake loose material.

Other objects are to provide a noise generator for shaking loose impacted material in storage enclosures which is relatively economical to manufacture and use and which is readily adaptable to conventionally constructed silos and similar enclosures to the end that no modification of the silo structures themselves is necessary.

Briefly, these and other objects and advantages of this invention are attained by providing a noise generator in the form of a valve body defining an air chamber. One end of this air chamber includes an opening defining a valve seat receiving a valve head disposed exteriorly of the chamber and normally positioned on the seat. A valve head stem extends within the air chamber and terminates in a spring seating flange. Cooperating with this flange is an annular channel on a mid-mounted frame structure serving also as a guide for the stem to house a powerful compression spring. This spring biases the valve head onto the valve seat in normally closed position.

An acoustic impedance matching horn is secured about the opening defining the valve seat and has its free end arranged to be placed in communication with the interior of a silo or enclosure containing impacted material. The chamber itself includes an inlet means for receiving air under pressure from a suitable source of high air pressure. An actuating means in turn is mounted on the valve body and arranged to actuate the valve stem. When the valve is momentarily open, a burst of air will travel down the horn in the form of a strong pressure wave to be received within the enclosure and loosen material within the silo.

In accord with a feature of the invention, there is provided a transducer arranged to be secured to the silo and provide a series of signals at repetition rate corresponding to a resonant frequency of the silo. These signals are initiated by the first shock wave provided by the noise generator and are used in turn to control the actuator for the noise generator by means of a suitable control circuit. There will thus be generated pressure waves by opening and closing of the valve head in the valve body at a rate corresponding to a resonant frequency of the silo thereby resulting in greatly increased amplification of the pressure waves and thereby assuring that impacted material will be shaken loose from the side walls.

A bettter understanding of the invention will be had by now referring to a specific embodiment thereof as illustrated in the accompanying drawings, in which.

Figure 1:
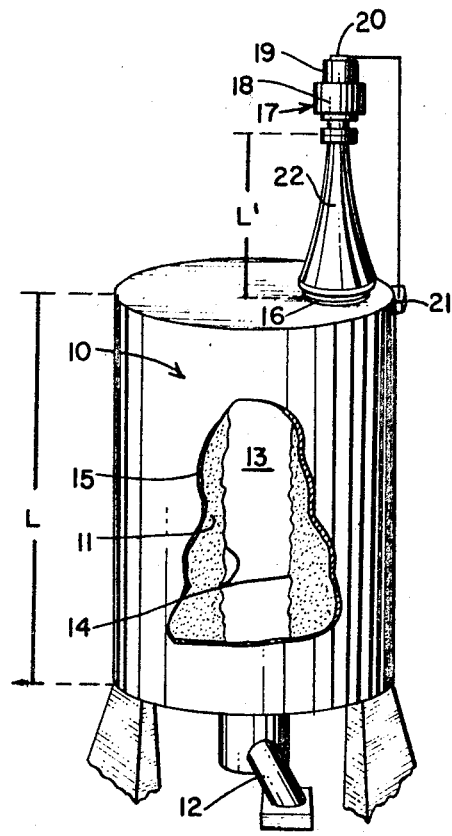
FIGURE 1 is a perspective view partly broken away and partly schematic illustrating the noise generator of this invention in conjunction with a silo.

Referring first to FIGURE 1 there is indicated a storage enclosure such as a silo 10 for storing powdered materials such as powdered cement 11. Normally, such silos are of cylindrical shape and, as mentioned, may vary in diameter from twenty to one hundred feet and be perhaps ten to twenty stories high. In FIGURE 1, the silo 10 is shown considerably smaller relative to the rest of the drawing merely for purposes of convenience.

The material 11 within the silo is emptied through a bottom outlet structure 12 normally at the center portion of the lower cylindrical end. When material is released from the silo, the center material directly above the opening will usually drain through the opening first and then portions of the material may or may not flake off from the surrounding area. In the case of powdered cement, particularly, the physical structure of the material is such that it tends to pack or cling to itself and the interior side walls until it is started in motion. In this latter instance, the small shaking up of the central portion of the powdered cement upon opening of the bottom outlet will usually result in a column of the cement flowing through the outlet leaving in the interior an elongated "rat hole" 13 as shown in FIGURE 1.

Often, less than fifty percent of the total volume of material within the silo would normally be removable in the absence of some type of agitation. Thus, the impacted material, as shown at 14 simply clings to the side wall 15 of the silo. It is then necessary for a worker to climb to the top of the silo and enter through a normally provided manhole 16 and agitate the material to free it and permit more to be withdrawn through the bottom outlet. Other current methods used to agitate the material involve the use of explosives which can be hazardous.

In accord with the present invention, rather than have the material loosened manually or by explosives, there is provided a noise generator designated generally by the numeral 17 and arranged to be permanently mounted on top of the silo above the manhole 16. As illustrated in FIGURE 1, this generator includes a valve body 18, an enclosure 19 for auxiliary actuating apparatus, a control circuit 20, a transducer 21 arranged to be secured to the silo 10, and an acoustic impedance matching horn 22 for coupling noise provided by the generator to the silo manhole 16 all as will become clearer as the description proceeds.

Figure 2:
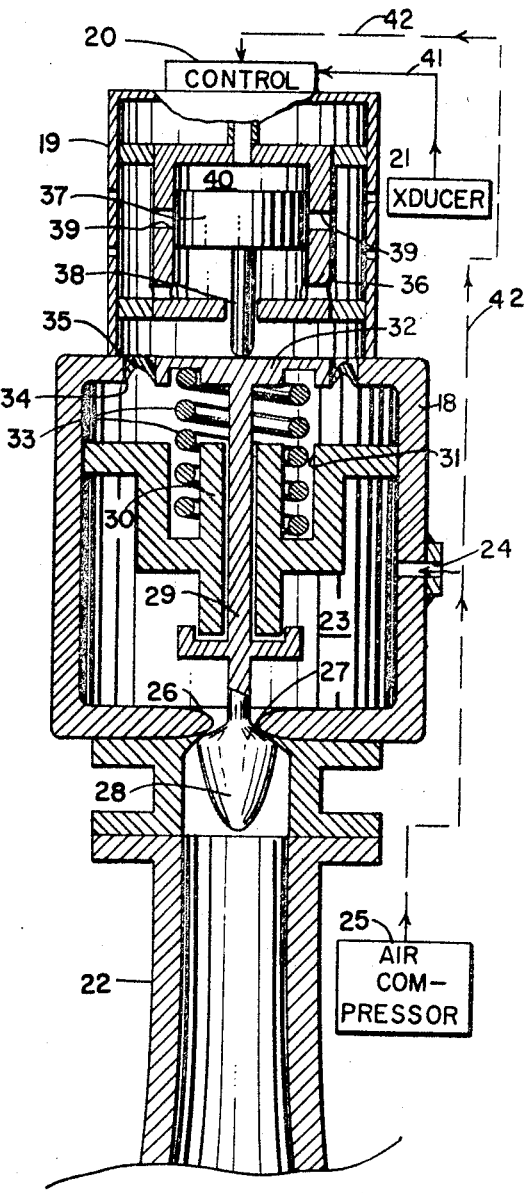
FIGURE 2 is a greatly enlarged view partly in cross section and partly in full lines of the noise generator of FIGURE 1.

Referring now to FIGURE 2, it will be noted that the valve body 18 defines an interior air chamber 23 having a side inlet opening 24 for receiving air under pressure from a suitable air compressor 25. As shown, the chamber includes an end opening at its lower wall defining a valve seat 26 for seating a valve head 27. The valve head 27 includes a streamlined nose portion 28 generally conically shaped and extending generally exteriorly of the chamber 23 itself. This nose 28 defines with the inner end of the acoutic impedance matching horn 22 an annular air passage of increasing cross-sectional area in a direction down the axis of the horn 22. The dimensioning is such as to provide an efficient expansion of the compressed air flowing from the chamber into the horn when the valve head 27 is momentarily lifted from the valve seat 26.

The valve head 27 is secured to a valve stem 29 at one end, the other end of the stem extending through the opening defining the valve seat and into the chamber through a suitable frame structure defining a guide 30 for the stem. This guide 30 also defines an annular spring seating channel 31. The stem 29 terminates at its far end in an annular spring seating flange 32 in opposed relationship to the annular channel 31 such that a powerful compression spring 33 may be positioned as shown in FIGURE 2.

The foregoing arrangement is such that the valve head 27 is forced into seating engagement with the valve seat 26 by the spring 33 to close the chamber 23.

The end of the chamber 23 opposite the valve seat 26 includes an opening 34 within which the end flange 32 is positioned. An O-ring or annular diaphragm such as shown at 35 in turn provides a seal for the chamber 23 and yet permits slight longitudinal movement of the flange 32 and valve stem 29 within the chamber. The valve head 27 may thus be momentarily unseated from the valve seat 26 by application of a suitable force to the exterior exposed end of the flange 32. The O-ring or diaphragm could be replaced by other sealing means such as heavy grease.

In the particular embodiment set forth for illustrative purposes, an actuated means is provided for actuating the valve stem and head to open the valve. This means takes the form of an auxiliary cylinder 36 housing a piston 37 having a stem 38 engaging the upper end of the flange 32. Suitable outlet air ports 39 are provided in the auxiliary cylinder 36 to permit escape of air in the area 40 above the piston 37 when the piston is forced downwardly to expose the openings 39. It will be evident that this forcing downwardly of the piston 37 will urge the flange 32 downwardly and thus move the valve head 27 from its seat 26.

Air pressure to the region 40 above the auxiliary piston 37 is periodically provided by the control circuit 20 mounted on the enclosure 19.

The control means is connected to receive signals from the transducer 21 through the line 41 as shown. The arrangement is such that the auxiliary piston 37 will only be actuated downwardly when a signal is received in the control means 20 through the line 41 from the transducer 21. Compressed air for operating the auxiliary piston 37 may be derived from the air compressor 25 through the branch line 42 as shown. Any other suitable actuator means may be employed for actuating the valve stem 29 in response to a signal from the control 20.

Figure 3:
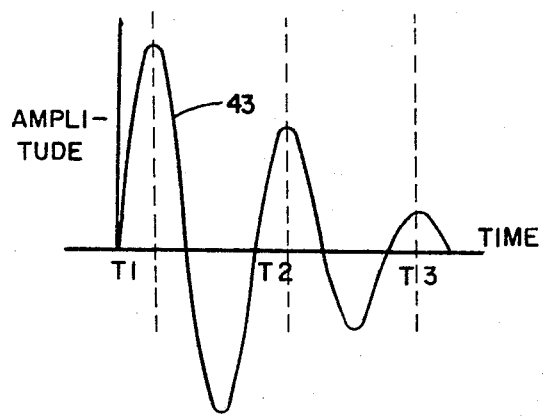
FIGURE 3 is a wave form useful in explaining part of the operation of the invention.

FIGURE 3 illustrates one curve of the instantaneous sound pressure level as a function of time when a burst of air is released from the chamber 23 of FIGURE 2 and transmitted through the horn to the interior of the silo. The various peaks of the curve 43 occurring at the time T1, T2, and T3 as illustrated in FIGURE 3, are determined by the natural resonant frequencies of the entire silo structure or the unfilled volume of the silo. The curve is damped as would result if only a single initial shock wave were provided. The actual curve of the instantaneous sound pressure level would be the sum of each individual resonance frequency present.

With the foregoing description in mind, the entire operation of the noise generator of this invention will now be described. As indicated in FIGURE 1, the noise generator and horn are secured to the top of the silo such that the axis of the horn 22 is directed along the axis of the manhole 16. It should be understood that the noise generator structure could be secured to any other suitable portion of the silo 10 but preferably the free end of the horn should have communication with the interior of the silo. In this regard, the acoustic impedance horn is shaped such that its increasing cross-sectional area terminates in a cross-sectional area corresponding subtantially to that of the manhole 16. There is thus provided proper acoustic impedance coupling between the horn and the interior of the silo.

With the structure assembled to the silo as described, assume that a portion of the impacted material 11 has been removed leaving the central "rat hole" 13 as shown in the broken away portion of FIGURE 1. To shake loose the remaining material 14, the noise generator 17 is actuated by initially causing burst of air to enter the chamber 40 of the auxiliary cylinder piston structure of FIGURE 2. The piston 37 will be driven downwardly extremely rapidly causing its piston rod portion 38 to urge the flange 32 and valve stem 29 together with the valve head 28 downwardly momentarily. When the piston 37 passes the outlet ports 39 of the auxiliary cylinder 36, the pressure behind the piston in the region 40 escapes and the piston 37 is immediately returned by the engagement of the flange 32 against the rod 38, this latter flange being urged upwardly by the compression spring 33. The force exerted by the compression spring 33 is sufficiently great that pressure build up in the chamber 23 cannot lift the valve head 27 from the seat 26. It is for this reason that the valve is only momentarily opened upon actuation of the auxiliary piston 37. However, the "dwell" time of opening can be controlled by the pulse width and pressure of air periodically supplied to the chamber 40. Again, it should be understood that any other means for actuating the valve stem 29 can be employed such as a motor and cam driving means with the "dwell" time controlled by the cam shape and speed of the motor.

The momentary opening of the valve head 27 from the valve seat 26 results in a burst of air passing about the annular passage defined by the conical portion 28 of the valve head and the initial interior portion of the horn 22. This burst of air is in the form of a shock wave which is acoustically coupled by means of the horn 22 to the interior of the silo 10 of FIGURE 1. The power of this shock wave is extremely large and will initially shake loose a large portion of the impacted material 14.

The shaking of the entire silo as a consequence of this initial shock wave will also result in wave forms such as illustrated in 43 being detected by the transducer 21 of FIGURE 1 with a resulting generation of a series of signals at a repetition rate corresponding to one of the resonant frequencies. These signals are passed into the control circuit 20 as described in FIGURE 2 through the line 41 which control circuit may include a suitable valve for passing pressurized air from the air compressor 25 directly to the interior area 40 of the auxiliary cylinder 36 above the piston 37. The piston 37 will thus be periodically actuated by air controlled by the control means 20 which in turn is controlled by signals from the transducer 21. The control circuit 20 will automatically select one of the most useful resonant frequencies and actuate the valve at the selected frequency.

As a consequence of the foregoing squence, the valve head 27 will periodically be lifted to release pressurized air in the chamber 23 so that a succession of shock waves will occur at substantially the resonant frequency of the entire silo 10. In fact, the entire silo will act as a gigantic resonant enclosure with the result that the remaining impacted material will eventually be shaken loose from the interior walls and may thus be retrieved through the outlet 12.

While the preferred form of the invention includes the transducer and control circuit, for certain types of stored material only a single shock wave may be necessary or only one fixed frequency could be manually set in the control.

It will be evident accordingly that the present invention has provided a device wherein all of the various objects are fully realized.

What is claimed is:

1. A noise generator for shaking loose packed material in a storage enclosure, comprising, in combination: a chamber for receiving air under pressure; an acoustic impedance matching horn connected to said chamber at one end and adapted to have its other end connected into communication with said enclosure; and a valve means for passing a burst of air under pressure in said chamber into said horn when actuated from a normally closed to an open position to thereby pass a pressure wave into said enclosure and shake loose said packed material.

2. A generator according to claim 1, in which said chamber includes an opening communicating with said horn and defining a valve seat, said valve means including: a valve head seated on said seat to close the same, a spring normally holding said alve head on said seat, and actuating means for moving said valve head from its normally closed position to its open position.

3. A generator according to claim 1, including a transducer adapted to be secured to said enclosure for providing a series of signals at a repetition rate corresponding to an effective resonant frequency of said enclosure in response to reception by said enclosure of said pressure wave; and control means connected to said transducer means and valve means for actuating said valve means each time a signal is received by said control means from said transducer means.

4. A noise generator for shaking loose packed material in a storage enclosure, comprising, in combination: a valve body defining an air chamber, said chamber having an opening in one end defining a valve seat; a valve head exterior of said chamber seated on said valve seat to close said opening; a valve stem having one end secured to said valve head and its other end passing through said opening into said chamber and terminating in a spring seating flange; a frame structure in said chamber defining a guide for said valve stem and also defining a spring seating annular channel intermediate the ends of said valve stem opposing said spring seating flange; a powerful compression spring disposed between said spring seating flange and channel to bias said valve head against said valve seat; an acoustic impedance matching horn means connected to said opening and defining with said valve head an initial annular air passage of increasing cross-sectional area along the axis of said horn means, said horn means being adapted to be connected to said storage enclosure containing packed material; means in said valve body for passing air under pressure into said valve chamber to pressurize said chamber; and actuating means coupled to said valve stem for moving said valve stem against the bias of said spring to momentarily unseat said valve head, whereby a burst of air under pressure passes through said horn means in the form of a pressure wave into said enclosure to thereby shake loose said material.

5. A generator according to claim 4, including a control mean connected to said actuating means to actuate the same each time a signal is received in said control means; and transducer means adapted to be secured to said enclosure for providing a series of signals to said control means at a repetition rate corresponding substantially to one of the resonant frequencies of said enclosure, said series of signals initially being generated in response to the reaction of said enclosure to said pressure wave.

6. A generator according to claim 5, in which the acoustic energy released by the valve and control means is efficiently coupled to the silo or other enclosure by said acoustic impedance matching horn such that a large percentage of the available energy in the compressed air is transformed into acoustic energy.

7. A generator according to claim 5, in which said actuating means comprises an auxiliary air cylinder and piston mounted on said valve body, said chamber having an opening at its end opposite said valve seat within which said spring seating flange is positioned; and an annular means sealing the periphery of said flange to said opening, said auxiliary piston having a piston rod engaging said flange and adapted to move said flange when said auxiliary cylinder is charged with air, said control means charging said auxiliary cylinder with air in response to each said signal.

References Cited
UNITED STATES PATENTS

| | | | |
|---|---|---|---|
| 3,067,914 | 12/1962 | Ellaby | 99—235 |
| 3,211,303 | 10/1965 | Linde | 99—235 |
| 3,259,272 | 7/1966 | Larson | 222—1 |

ROBERT W. JENKINS, Primary Examiner

U.S. Cl. X.R.

49—235; 222—196